United States Patent
Malligere et al.

(10) Patent No.: US 10,279,913 B2
(45) Date of Patent: May 7, 2019

(54) CONSOLIDATED SEAT BACK BREAKOVER MECHANISM

(71) Applicant: Zodiac Seats US LLC, Gainesville, TX (US)

(72) Inventors: Girish J. Malligere, Dallas, TX (US); Nahum Madrid, Denton, TX (US); Michael T. Murray, Ardmore, OK (US); Michael Willey, Denton, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 15/756,951

(22) PCT Filed: Jun. 20, 2016

(86) PCT No.: PCT/US2016/038371
§ 371 (c)(1),
(2) Date: Mar. 1, 2018

(87) PCT Pub. No.: WO2017/044169
PCT Pub. Date: Mar. 16, 2017

(65) Prior Publication Data
US 2018/0237142 A1 Aug. 23, 2018

Related U.S. Application Data

(60) Provisional application No. 62/306,301, filed on Mar. 10, 2016, provisional application No. 62/217,314, filed on Sep. 11, 2015.

(51) Int. Cl.
*B64D 11/06* (2006.01)
*B60N 2/427* (2006.01)
*B60N 2/42* (2006.01)

(52) U.S. Cl.
CPC ........ *B64D 11/0619* (2014.12); *B60N 2/4221* (2013.01); *B60N 2/42745* (2013.01);
(Continued)

(58) Field of Classification Search
CPC ............ B64D 11/0619; B60N 2/42745; B60N 2/42781; B60N 2/4221
See application file for complete search history.

(56) References Cited

U.S. PATENT DOCUMENTS

| | | | |
|---|---|---|---|
| 5,320,308 A | 6/1994 | Bilezikjian et al. | |
| 5,462,332 A * | 10/1995 | Payne | B60N 2/233 297/216.1 |

(Continued)

FOREIGN PATENT DOCUMENTS

| | | |
|---|---|---|
| DE | 10346397 | 8/2004 |
| EP | 0581592 | 2/1994 |

(Continued)

OTHER PUBLICATIONS

International Patent Application No. PCT/US2016/038371, International Search Report and Written Opinion, dated Sep. 26, 2016.
(Continued)

*Primary Examiner* — David R Dunn
*Assistant Examiner* — Tania Abraham
(74) *Attorney, Agent, or Firm* — Kilpatrick Townsend & Stockton LLP; Dean W. Russell; Davidson G. Lucas

(57) ABSTRACT

Described is a breakover mechanism for a passenger seat that includes a frame member with a rear portion attached to two opposing sides of a seat back of the passenger seat wherein the frame member is at least partially disposed under a seat pan of the passenger seat, at least one moving portion attached to a forward portion of the frame member, a carriage portion fixedly attached to the seat pan; and a single point mechanism attached to the carriage portion.
(Continued)

Once a threshold loading condition occurs, the single point mechanism changes states to facilitate movement of the moving portion relative to the carriage portion.

20 Claims, 11 Drawing Sheets

(52) U.S. Cl.
CPC ..... *B60N 2/42772* (2013.01); *B60N 2/42781* (2013.01); *Y02T 50/46* (2013.01)

(56) References Cited

U.S. PATENT DOCUMENTS

| | | | | |
|---|---|---|---|---|
| 5,507,555 | A * | 4/1996 | Kiguchi | B60N 2/10 297/216.1 |
| 6,109,690 | A | 8/2000 | Wu et al. | |
| 7,029,067 | B2 * | 4/2006 | Vits | B60N 2/242 297/216.12 |
| 7,354,105 | B2 * | 4/2008 | Nelson | B60N 2/4221 297/216.1 |
| 8,991,569 | B1 | 3/2015 | Lou et al. | |
| 2002/0030391 | A1 * | 3/2002 | Merrick | B60N 2/242 297/216.1 |
| 2007/0085390 | A1 | 4/2007 | Kawashima et al. | |
| 2008/0122243 | A1 * | 5/2008 | Ravid | B60N 2/4242 296/68.1 |
| 2008/0211275 | A1 * | 9/2008 | Lamparter | B60N 2/686 297/216.13 |
| 2010/0052378 | A1 * | 3/2010 | Marriott | B60N 2/242 297/216.1 |
| 2014/0070578 | A1 * | 3/2014 | Szelagowski | B60N 2/427 297/216.13 |
| 2017/0152048 | A1 | 6/2017 | Schmeer et al. | |
| 2018/0222361 | A1 | 8/2018 | Murray et al. | |

FOREIGN PATENT DOCUMENTS

| | | |
|---|---|---|
| EP | 1777101 | 4/2007 |
| WO | 2016001374 | 1/2016 |
| WO | 2017044170 | 3/2017 |

OTHER PUBLICATIONS

International Patent Application No. PCT/US2016/038393, Search Report and Written Opinion dated Nov. 7, 016.

* cited by examiner

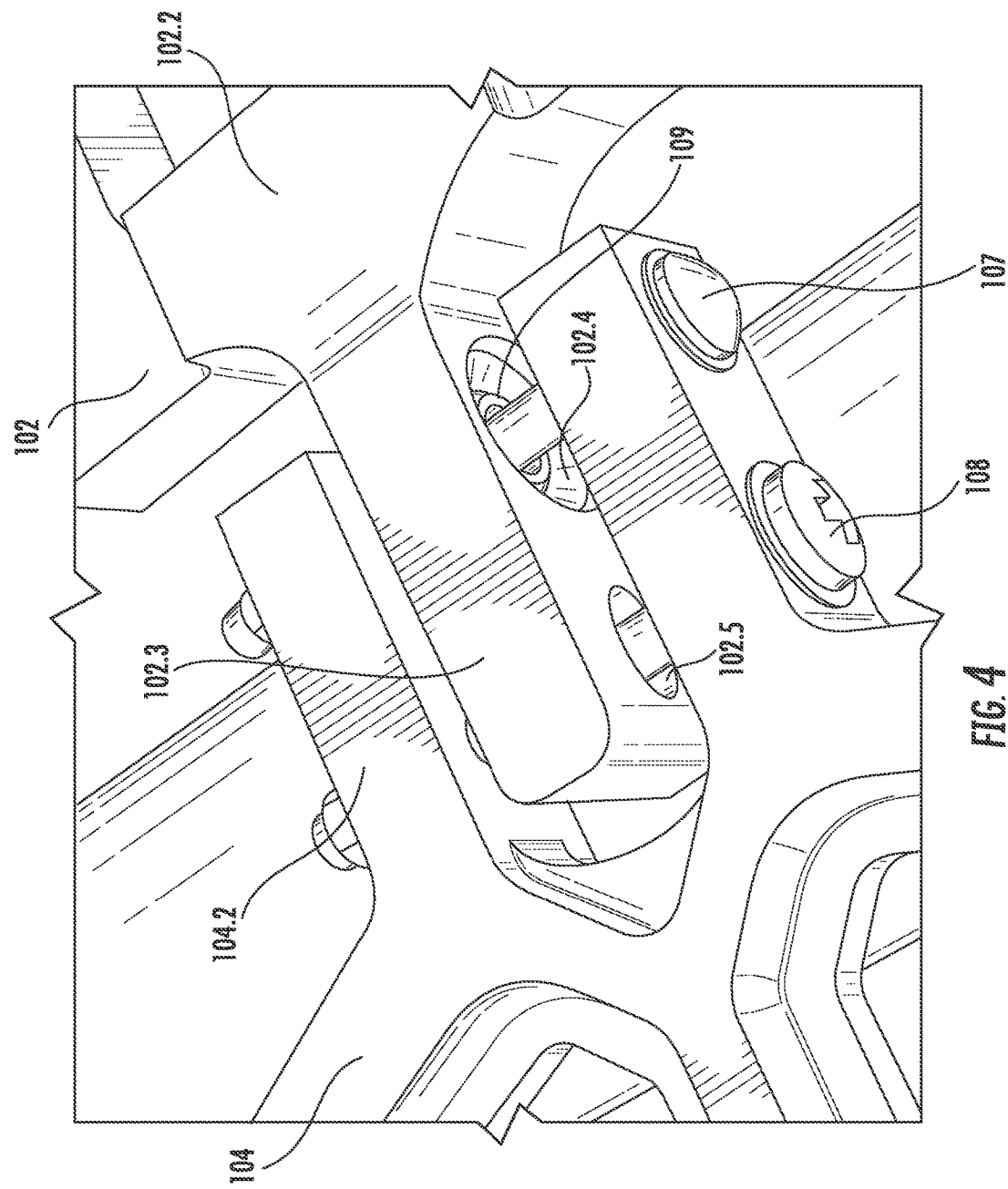

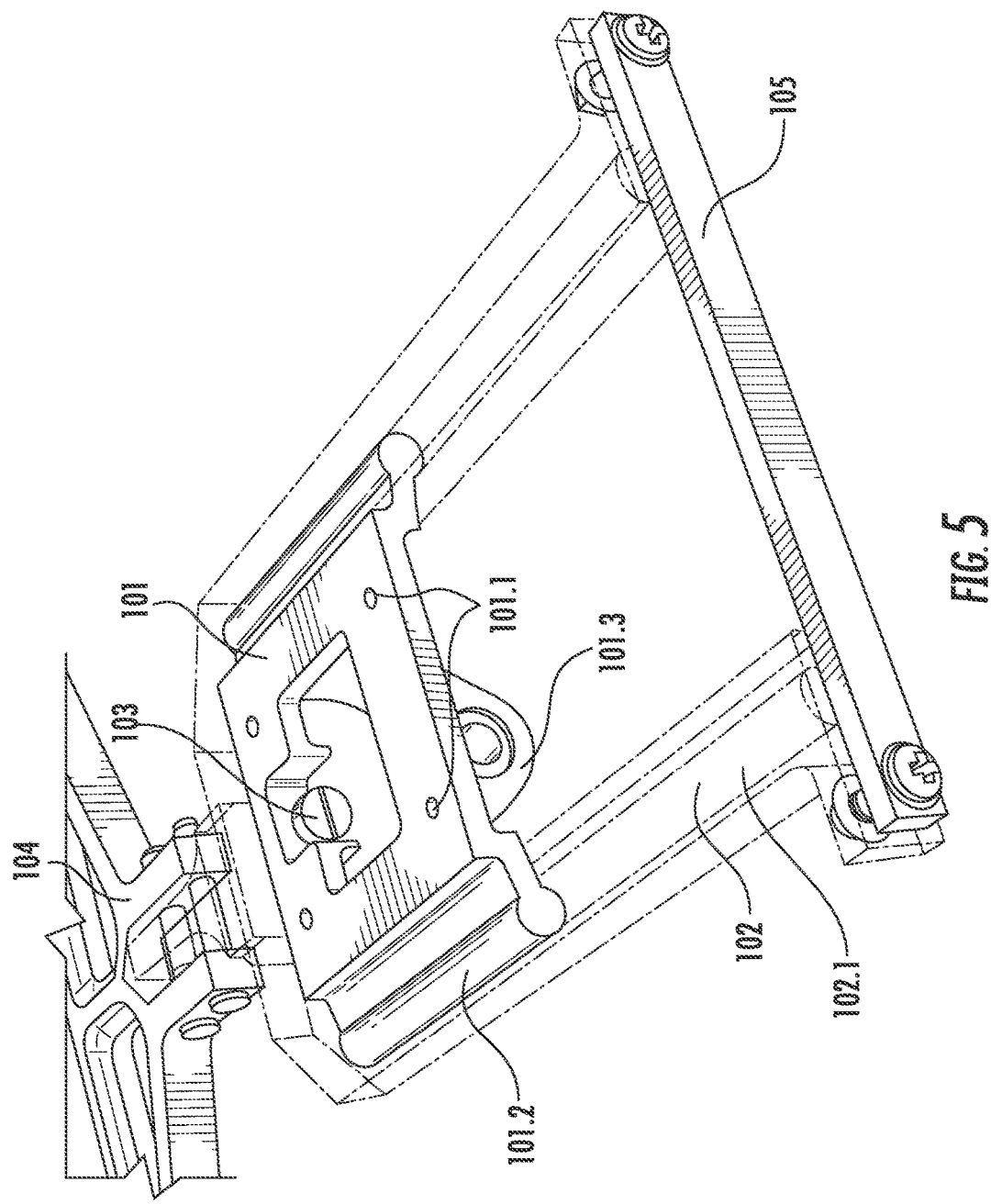

CONSOLIDATED SEAT BACK BREAKOVER MECHANISM

CROSS REFERENCE TO RELATED APPLICATIONS

This application is related to and claims priority benefit from U.S. Provisional Application No. 62/217,314 ("the '314 application"), filed on Sep. 11, 2015, entitled INERTIAL BREAKOVER MECHANISM and U.S. Provisional Application No. 62/306,301 ("the '301 application"), filed on Mar. 10, 2016, entitled MONO PIN SEAT BACK BREAKOVER MECHANISM. The '314 and '301 applications are hereby incorporated in their entireties by this reference.

This application incorporates by reference the disclosure of a copending PCT patent application. The copending PCI patent application is "INERTIAL BREAKOVER MECHANISM," PCT Application No. PCT/US2016/038393, to Murray et al., filed on Jun. 20, 2016.

FIELD OF THE INVENTION

The field of the invention relates ergonomic lie-flat passenger seats for aircraft or the like.

BACKGROUND

Passenger seats, and particularly vehicle or aircraft passenger seats, are designed to ensure passenger safety for various loading conditions including, for example, hard landings and crash conditions. In some instances, regulatory and/or governmental requirements dictate that seats comply with occupant protection/head impact tests. The general intent is that the seat has a joint or mechanism designed to rotate the seatback forward during an impact, such that when a passenger from a row behind the seat moves forward (due to rapid deceleration of the vehicle or aircraft), the impact forces between the passenger's head and the seat can be reduced. Reducing head accelerations/decelerations and the related forces decrease the likelihood of head trauma and head injuries. However, the seats must also withstand typical non-crash load abuse, such as passengers leaning heavily against the seat, using the seat as a brace, and other non-crash loading conditions.

Many seatbacks are attached to a stable quadrant arm on each side of a seat frame. In order to meet head impact criteria testing, the seat is designed to distribute head impact loads from the seat back to shear pins on both sides of the seat back. The shear pins constrain rotation of the back relative to the quadrant arms until impact. At impact, the shear pins serve as a break over device, designed to fail during an impact event and to allow the back to rotate forward. This can reduce head accelerations. However, shear pins have strict limits on breakout force and timing because they must be strong enough to survive static loading and can only allow break over when impact loads exceed the ultimate load on both pins. The challenge is often that because the shear pins must withstand general abuse loads, they may be so strong as to require excessive acceleration in order to break/shear properly. However, if the strength of the frangible joint/shear pin is reduced, the seat may not be strong enough to withstand expected general abuse loads. For example, some of the current seat designs have problems during 10 degree impact events, when asymmetrical loading on the back requires high rigidity in the back structure to transfer sufficient loads to both shear pins. In general, a shear pin break over device necessitates a highly reinforced seatback structure that is rigid enough to predictably transmit loads to both quadrant arms, but also cushioned to reduce head accelerations on initial impact. In some cases, despite a rigid structure for a seat back, loads distributed to a quadrant arm on one side are significantly different than load distributed to a second quadrant arm of the second side of the seat. Such a structural arrangement can add weight to the seatback structure, and can require costly iterations of testing.

In certain situations, it may be desirable to design seats to efficiently, predictably, and repeatably rotate the seatback forward during crash or other loading conditions.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a breakover mechanism for a passenger seat comprises: a frame member with a rear portion attached to two opposing sides of a seat back of the passenger seat wherein the frame member is at least partially disposed under a seat pan of the passenger seat; at least one moving portion attached to a forward portion of the frame member; a carriage portion fixedly attached to the seat pan; and a single point mechanism attached to the carriage portion wherein, once a threshold loading condition occurs, the single point mechanism changes states to facilitate movement of the moving portion relative to the carriage portion.

In some embodiments, the threshold loading condition comprises a crash condition.

The single point mechanism, in certain embodiments, comprises a tension pin. In certain embodiments, the tension pin comprises a first end attached to the carriage portion and a second end attached to the at least one moving portion.

The tension pin, in certain embodiments, comprises a notch and the tension pin changes states when the tension pin fails under a tensile load.

In some embodiments, the at least one moving portion slides in a fore/aft direction of the passenger seat relative to the carriage portion.

In certain embodiments, the carriage portion comprises protrusions that engage corresponding channels of the at least one moving portion such that the protrusions slide through the channels in the fore/after direction.

The at least one moving portion, in certain embodiments, comprises a lug fitting that engages a clevis fitting of the frame member. In some embodiments, the lug fitting comprises a spherical bearing for engaging a pin attached to the clevis fitting.

An engagement between the lug fitting and the clevis fitting, in certain embodiments, comprises a first primary fastener and a second failsafe fastener.

In certain embodiments, the single point mechanism comprises an inertia weight assembly. The inertia weight assembly, in some embodiments, comprises a pivoting arm, a weight disposed at a first end of the pivoting arm, a roller at a second end of the pivoting arm, and a pivot point disposed between the first end and the second end.

In some embodiments, the inertia weight assembly changes states when the weight moves forward due to the threshold loading condition and causing the pivoting arm to rotate about the pivot point.

In certain embodiments, the at least one moving portion comprises two pivot arms that each rotate about a vertical axis of the passenger seat relative to the carriage portion.

The at least one moving portion, in certain embodiments, comprises two pivot arms that each comprise a rear slot that interfaces with the frame member.

According to certain embodiments of the present invention, a passenger seat comprises: a seat back comprising an upper portion and a lower portion; a seat pan; and a breakover mechanism configured to facilitate rotation of the seat back, wherein the breakover mechanism comprises: a frame member with a rear portion attached to two opposing sides of the lower portion of the seat back wherein the frame member is at least partially disposed under the seat pan; a slide rail attached to a forward portion of the frame member; a slide carriage fixedly attached to the seat pan; and a tension pin attached to a rear side of the slide carriage wherein, once a threshold loading condition occurs, the tension pin changes states to facilitate movement of the slide rail relative to the slide carriage.

In some embodiments, the tension pin comprises a first end attached to the slide carriage and a second end attached to the slide rail.

The tension pin, in certain embodiments, comprises a notch and the tension pin changes states when the tension pin fails under a tensile load.

According to certain embodiments of the present invention, a passenger seat comprises: a seat back comprising an upper portion and a lower portion; a seat pan; and a breakover mechanism configured to facilitate rotation of the seat back, wherein the breakover mechanism comprises: a frame member with a rear portion attached to two opposing sides of the lower portion of the seat back wherein the frame member is at least partially disposed under the seat pan; two pivot arms that are each attached to a forward portion of the frame member; a carriage frame fixedly attached to the seat pan; and an inertia weight assembly attached to the carriage frame wherein, once a threshold loading condition occurs, the inertia weight assembly changes states to facilitate movement of the two pivot arms relative to the carriage frame.

In certain embodiments, the inertia weight assembly comprises a pivoting arm, a weight disposed at a first end of the pivoting arm, a roller at a second end of the pivoting arm, and a pivot point disposed between the first end and the second end.

The inertia weight assembly, in some embodiments, changes states when the weight moves forward due to the threshold loading condition and causing the pivoting arm to rotate about the pivot point.

In some embodiments, the breakover mechanism comprises a first link and a second link; and the breakover mechanism comprises a retracted configuration where the first and second links are parallel with one another.

The inertia weight assembly, in certain embodiments, presses a hinge between the first and second links to move the breakover mechanism from the retracted configuration to a deployed configuration where the first and second links are nonparallel with one another.

BRIEF DESCRIPTION OF THE DRAWINGS

FIG. 4 is a detail perspective view of the passenger seat of FIG. 1A.

FIG. 5 is a detail perspective view of the passenger seat of FIG. 1A.

DETAILED DESCRIPTION

Figure 1A:
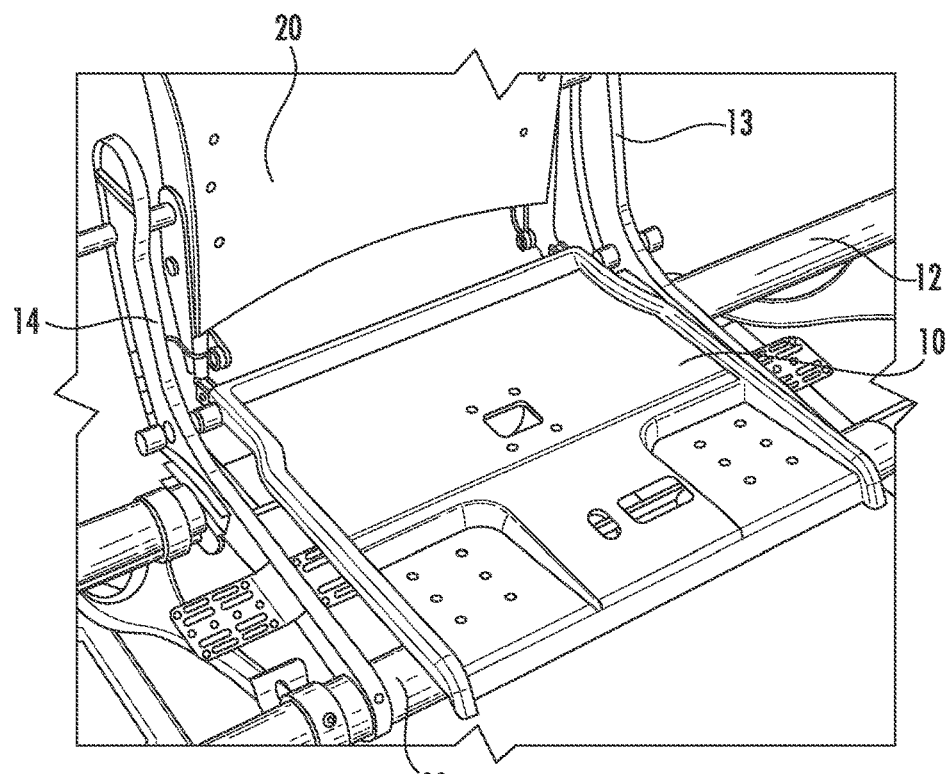
FIG. 1A is a perspective view of a passenger seat according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1A-6B illustrate embodiments of passenger seats with breakover mechanisms 100 and FIGS. 7A-11 illustrate embodiments of passenger seats with breakover mechanisms 200. In these embodiments, the passenger seat may include a seat pan 10, a seat back 20, a forward lateral beam 11, an aft lateral beam 12, a first seat frame member 13, and a second seat frame member 14.

Figure 1B:
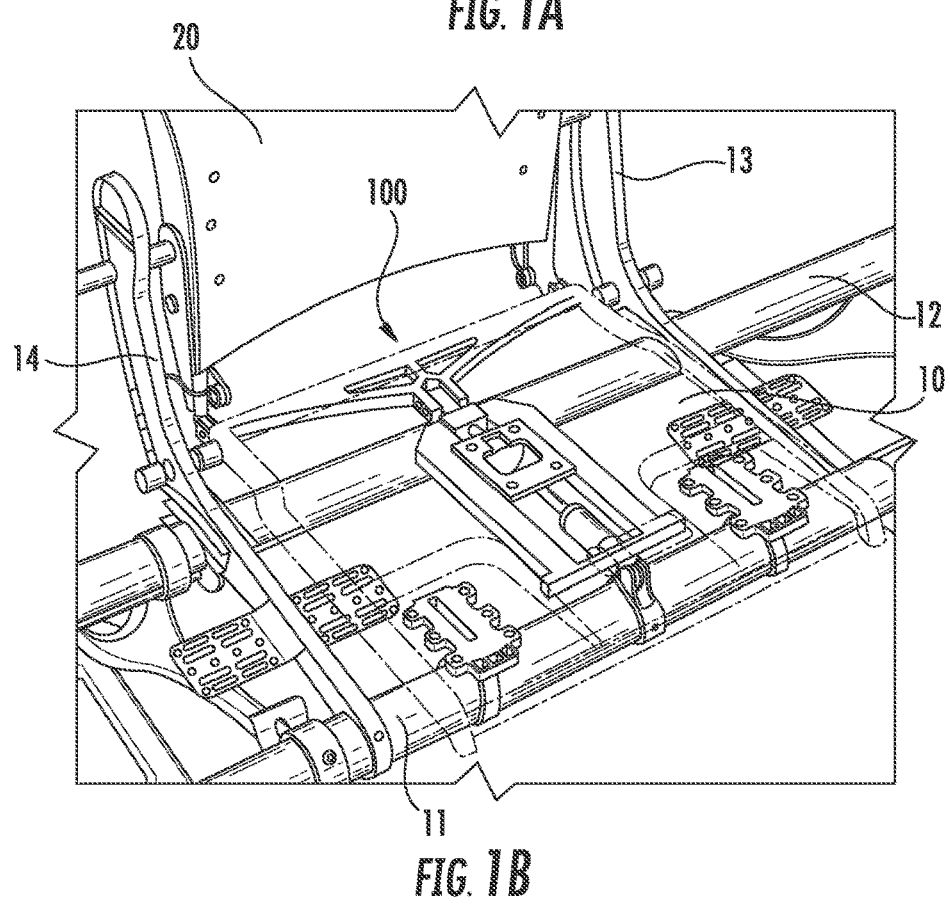
FIG. 1B is a perspective view of the passenger seat of FIG. 1A with the seat pan shown transparent.
Figure 7A:
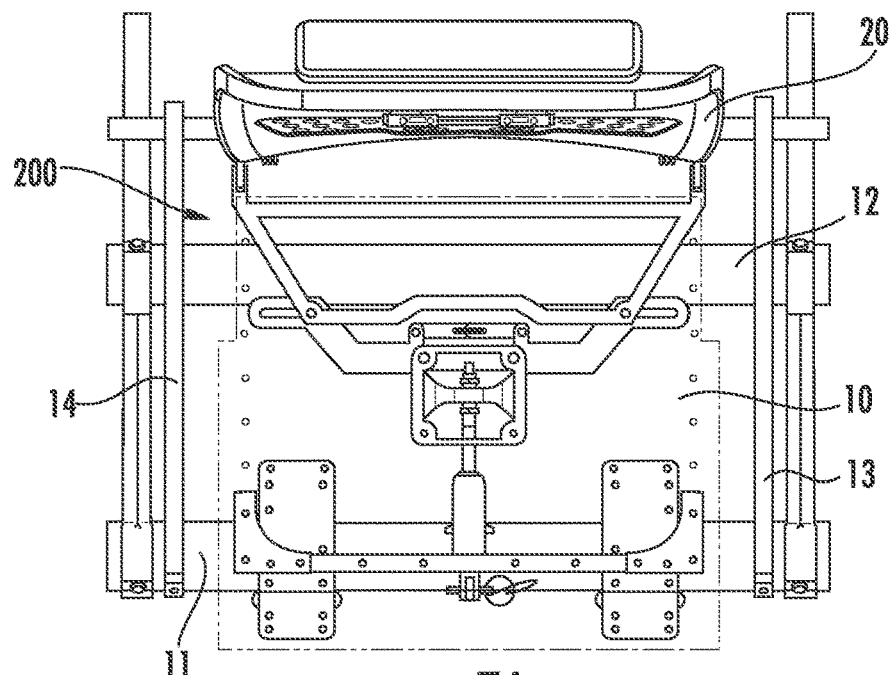
FIG. 7A is a top view of a passenger seat according to certain embodiments of the present invention.

FIGS. 1A and 1B show a passenger seat such that the seat pan 10 is transparent in FIG. 1B allowing the breakover mechanism 100, which, in some embodiments, is located under the seat pan 10, to be visible. Similarly, as shown in FIGS. 7A-8, the breakover mechanism 200 may also be located under the seat pan 10. Breakover mechanism 100 and breakover mechanism 200 each distribute loads from both sides of the seat back 20 through a frame member (frame 104 or frame 204) and a moving portion (slide rail 102 or pivot arm 202) and consolidate the loads into a single mechanism or a single point mechanism (tension pin 103 or inertia weight assembly 203), which may be located under the seat pan 10, to facilitate pivoting of the seat back 20. Breakover mechanism 100 and breakover mechanism 200 each include a carriage portion (slide carriage 101 or carriage frame 201) that, in some embodiments, is fixedly attached to the seat pan 10.

Figure 2:
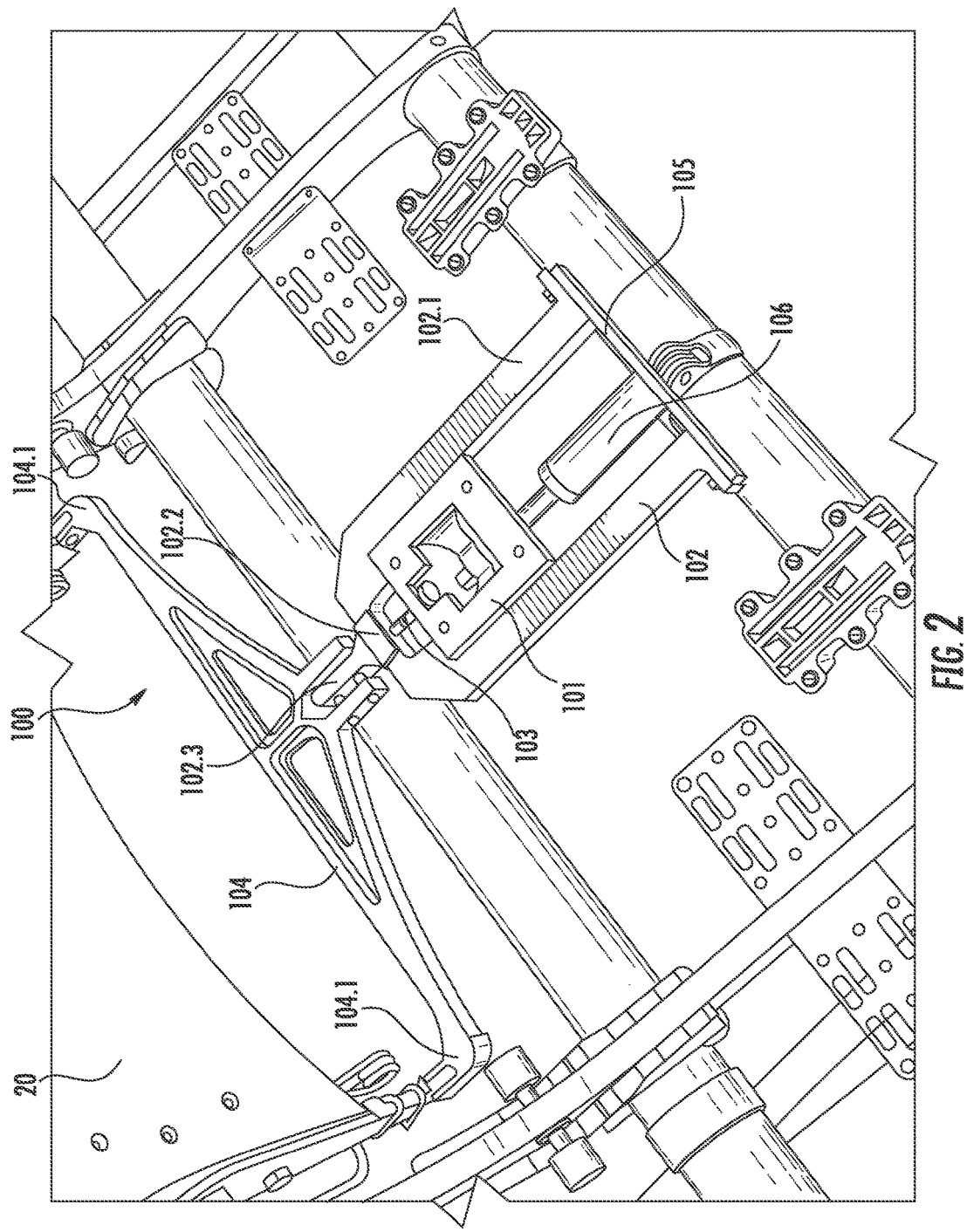
FIG. 2 is a detail perspective view of the passenger seat of FIG. 1A.
Figure 3:
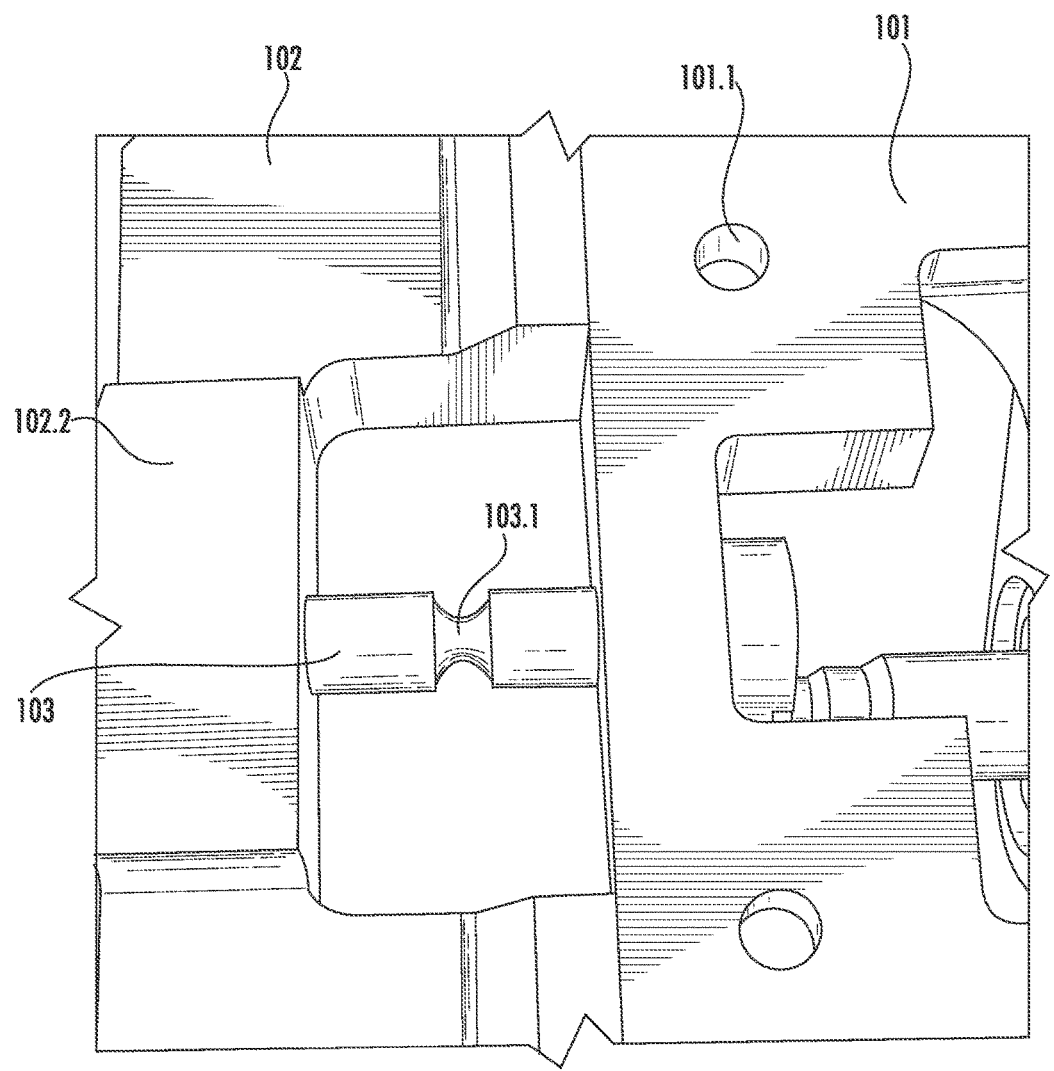
FIG. 3 is a detail perspective view of the passenger seat of FIG. 1A.

As shown in FIG. 2, the breakover mechanism 100 may include a slide carriage 101, a slide rail 102, a tension pin 103, a frame 104, and a limit plate 105. In some embodiments, the slide carriage 101 interfaces with a recline gas strut 106 (see strut mount 101.3 in FIG. 5). The slide carriage 101, as shown in FIGS. 3 and 5, may include one or more attachment holes 101.1 for attaching the slide carriage 101 to the seat pan 10. As one example, FIG. 5 shows a square pattern of four attachment holes 101.1; however, the slide carriage 101 may include any number of attachment holes 101.1 in any appropriate pattern (i.e., rectangular, circular, triangular, trapezoidal, pentagonal, hexagonal, etc.).

The lateral edges of the slide carriage 101, as shown in FIG. 5, may include protrusions 101.2 configured to slide in corresponding channels 102.1 in slide rail 102. In some embodiments, the slide rail 102 may include protrusions that slide in channels located in the slide carriage 101. As one example, FIG. 5 shows that the protrusions 101.2 have a cylindrical or partially-cylindrical cross section that is constant along the length of the protrusions 101.2. However, the protrusions 101.2 may have any appropriate shape that facilitates consistent movement of the slide carriage 101 along the length of the slide rail 102. For example, the protrusions 101.2 may have an oval, elliptical, dovetail, polygonal, or any other appropriate cross sectional shape. Further, the protrusions 101.2 may be configured with a cross-section that changes along the length of the protrusion 101.2. For example, the protrusions 101.2 may taper larger or smaller, and the corresponding channels 102.1 of the slide rail 102 may include a matching taper or a similar taper.

As shown in FIG. 2, the frame 104 includes attachment points 104.1 for attaching to both sides of the lower portion of the seat back 20. When loading conditions cause the upper portion of the seat back to move forward and pivot the seat back to cause the lower portion of the seat back to move rearward (such as a head impact during a crash condition), the frame 104 is pulled toward the rear of the seat (toward the top left portion of FIG. 2). The forward portion of the frame 104 is attached to the slide rail 102.

The attachment between the frame 104 and the slide rail 102, which is shown in FIG. 4, may include one or more fastened joints. For example, the frame may include a clevis fitting 104.2 configured to interface with a lug fitting 102.3 from the slide rail 102. In some embodiments, the frame 104 may include a lug and the slide rail 102 may include a clevis. As shown in FIG. 4, the lug fitting 102.3 may include a first hole 102.4 for interfacing with a first fastener 107. The first hole 102.4 and the first fastener 107 may be arranged such that the axial direction of each is arranged approximately parallel to the lateral direction of the seat. In some embodiments, the first hole 102.4 may be configured to secure a spherical bearing 109. The presence of the spherical bearing 109 introduces an extra degree of freedom to reduce the transfer of lateral forces from the frame 104 to the slide rail 102. In other words, if one side of the seat back 20 transfers more force into the frame 104 (e.g., due to a nonsymmetrical loading condition, such as a non-centered head impact), the frame 104 may include some lateral or twisting forces (in addition to fore/aft forces) relative to the seat.

The spherical bearing 109 reduces the transmittal of any lateral or twisting forces into the slide rail 102, which reduces potential binding between the protrusions 101.2 and the corresponding channels 102.1 of the slide rail 102. The spherical bearing 109 also ensures that the loads transferred from the slide rail 102 to the tension pin 103 are primarily or exclusively tensile forces.

As shown in FIG. 4, in some embodiments, the interface between the frame 104 and the slide rail 102 includes a second fastener 108. The second fastener 108 may interface with a second hole 102.5 of the slide rail 102. In certain embodiments, the second hole 102.5 is a slotted hole (elongated in the fore/aft direction of the seat) such that, unless the first fastener 107 and/or the spherical bearing 109 fail, no fore/aft loads are transferred through the second fastener 108. In other words, the second fastener 108 and second hole 102.5 function as a failsafe for the first fastener 107 (i.e., the primary fastener). In addition, the second fastener 108 prevents the frame 104 and slide rail 102 from rotating relative to one another about the axis of the first fastener 107. To prevent such rotation, the second fastener 108 contacts the upper and/or lower surface of the second hole 102.5.

When a force is applied to the upper portion of the seat back 20 (one example of such a force is a head impact from a passenger located behind the seat), the seat back 20 pivots such that the frame 104 is pulled toward the rear of the seat. As described above, loads are transferred from the frame 104 through the spherical bearing 109 into the slide rail 102 such that the loads transferred into the slide rail 102 are primarily or exclusively in the fore/aft direction (no lateral forces are transferred into the slide rail). As shown in FIGS. 2 and 5, the slide rail 102 may include channels 102.1 that correspond to the protrusions 101.2 of the slide carriage 101 such that the interface between the channels 102.1 and protrusions 101.2 constrain movement in all directions other than along the length of the protrusions 101.2, which approximately corresponds to the fore/aft direction of the seat. The slide carriage 101 is fixed to the seat pan 10 (via the one or more attachment holes 101.1), but the slide rail 102 is free to slide fore/aft relative to the slide carriage 101, except for the tension pin 103. As shown in FIGS. 2, 3, and 5, the tension pin 103 attaches the slide carriage 101 to the center section 102.2 of the slide rail 102. In some embodiments, the tension pin 103 includes a notch 103.1 with a reduced cross-sectional area compared to the remaining portion of the pin. The tension pin 103 is designed to fail due to a known applied force (i.e., a threshold load) tailored to the breakover mechanism 100. The tension pin 103 may be configured to fail at a known force due to the notch 103.1 and/or specific material properties of the tension pin 103. In other words, the tension pin 103 may be configured without a notch. In addition to consolidating the loads from both sides of the seat back 20 to a single location at the tension pin 103, tensile failures are more documented and more predictable than shear failures.

Figure 6A:
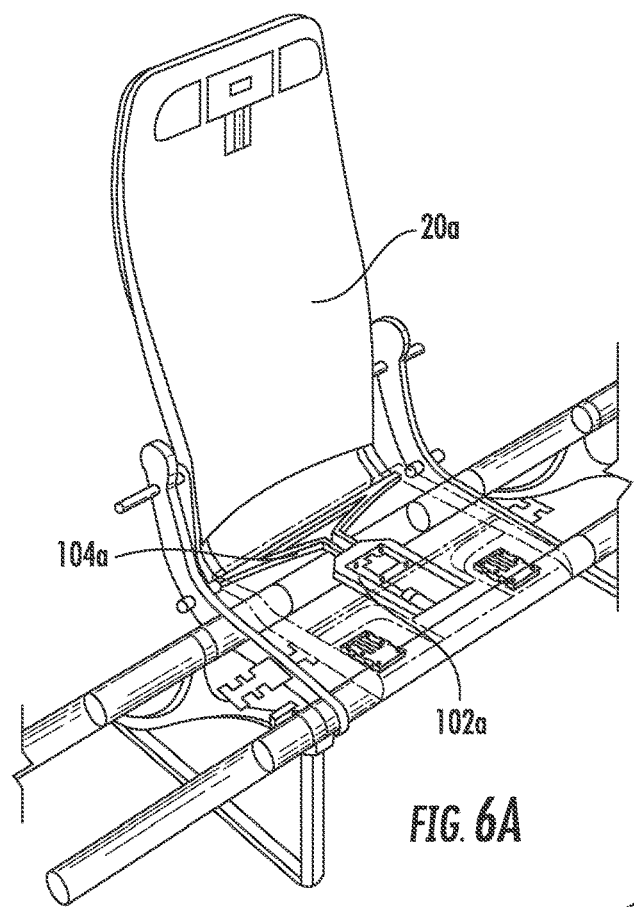
FIG. 6A is a perspective view of the passenger seat of FIG. 1A in the retracted configuration.
Figure 6B:
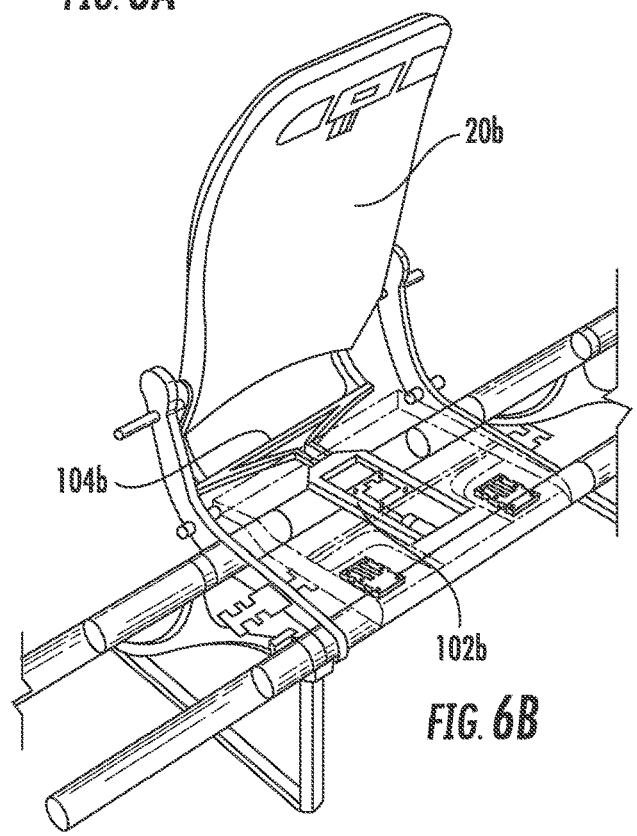
FIG. 6B is a perspective view of the passenger seat of FIG. 1A in the deployed configuration.

After the designed failure of the tension pin 103, the slide rail 102 is free to slide relative to the slide carriage 101. The slide rail 102 is typically secured in the static or retracted configuration shown in FIGS. 5 and 6A where the seat back 20 is in the retracted position 20a, the frame 104 is in the retracted position 104a, and slide rail 102 is in the retracted position 102a. As shown in FIG. 6B, after the tension pin 103 fails, the seat back 20 may pivot to a deployed position 20b, the frame 104 may move rearward to a deployed position 104b, and the slide rail 102 may move rearward to a deployed position 102b. The deployed position 102b of the slide rail 102 may be dictated by the limit plate 105 (see FIGS. 2 and 5). In some embodiments, the deployed position 102b of the slide rail 102 may be dictated by the range of motion of the seat back 20.

Figure 7B:
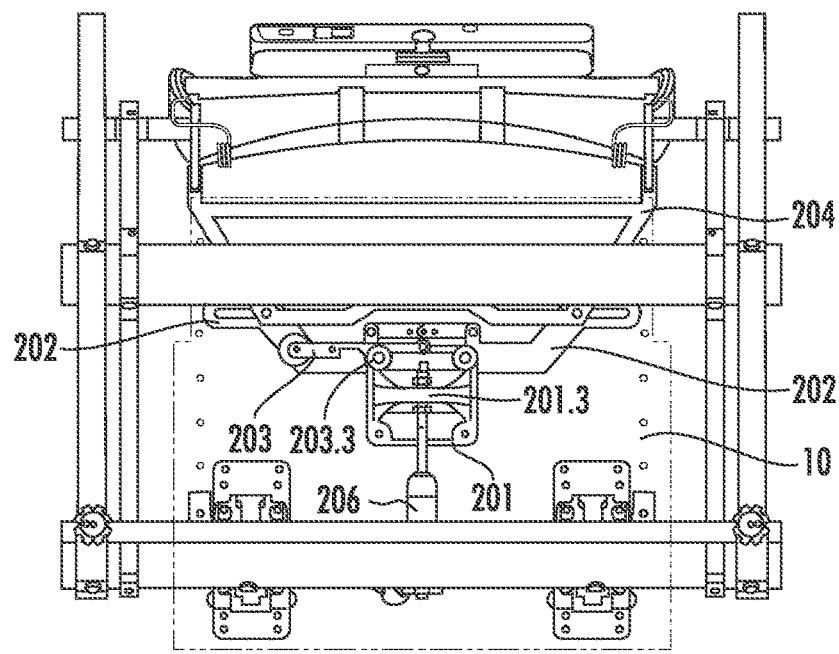
FIG. 7B is a bottom view of the passenger seat of FIG. 7A.
Figure 8:
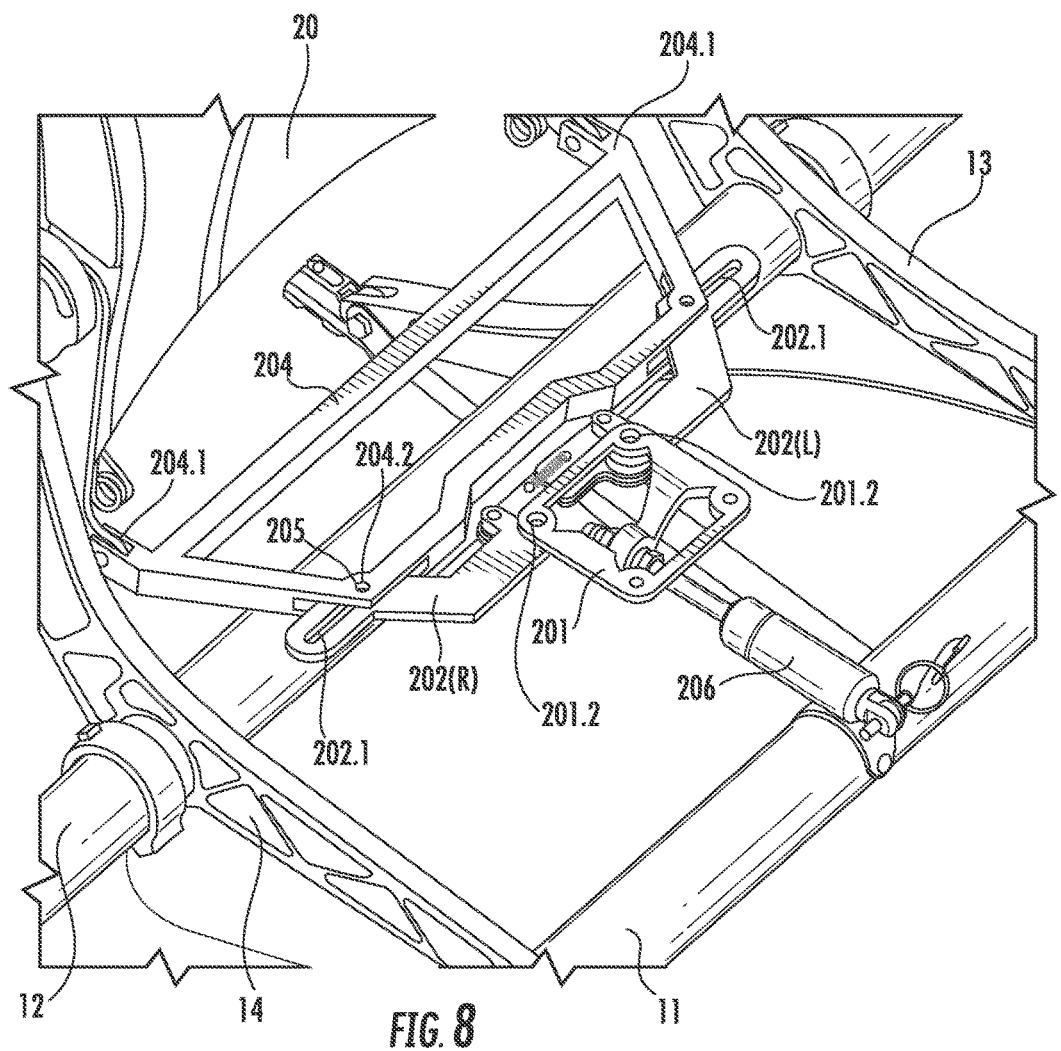
FIG. 8 is a detail perspective view of the passenger seat of FIG. 7A.
Figure 9:
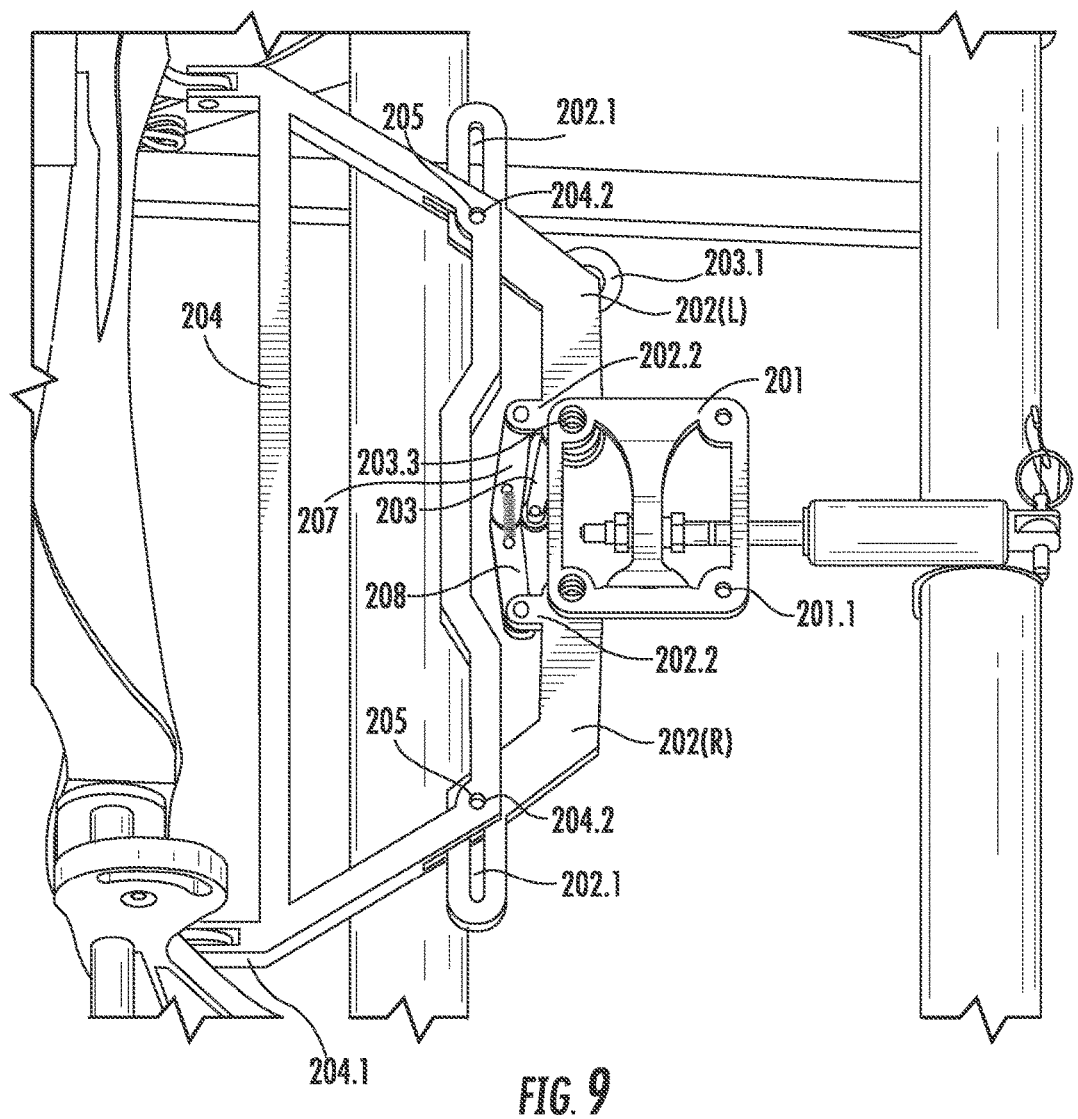
FIG. 9 is a detail perspective view of the passenger seat of FIG. 7A.

As shown in FIGS. 7A-8, the breakover mechanism 200 may include a carriage frame 201, one or more pivot arms 202, an inertia weight assembly 203, a frame 204, one or more sliding pins 205, a first link 207, and a second link 208. In some embodiments, the carriage frame 201 interfaces with a recline gas strut 206 (see strut mount 201.3 in FIGS. 7B and 10). The carriage frame 201, as shown in FIG. 9, may include one or more attachment holes 201.1 for attaching the carriage frame 201 to the seat pan 10. As one example, FIG. 9 shows a square pattern of four attachment holes 201.1; however, the carriage frame 201 may include any number of attachment holes 201.1 in any appropriate pattern (i.e., rectangular, circular, triangular, trapezoidal, pentagonal, hexagonal, etc.).

Figure 10:
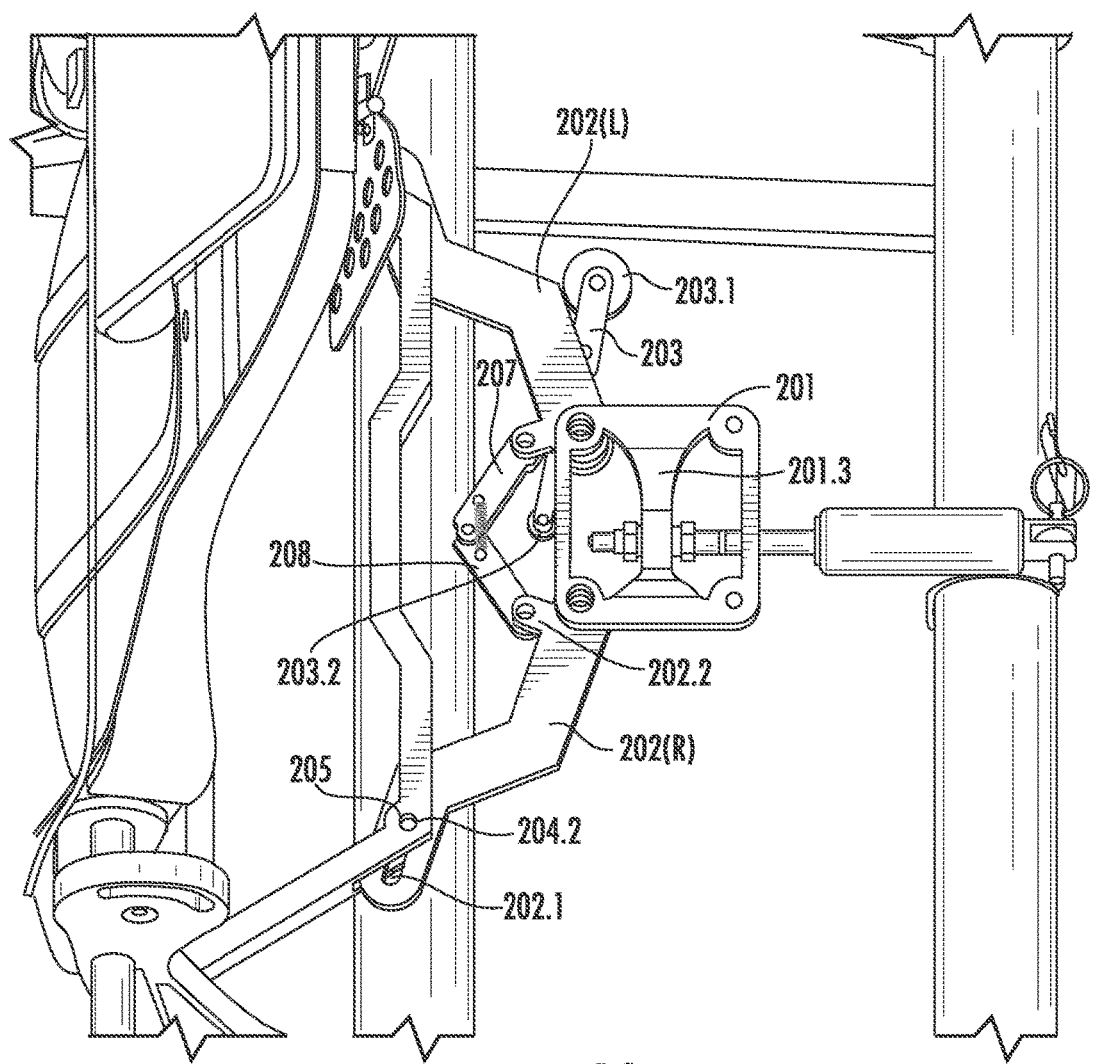
FIG. 10 is a detail perspective view of the passenger seat of FIG. 7A.

In some embodiments, the two rear holes of the carriage frame 201 each form a pivot 201.2 to allow each pivot arm 202 to rotate about the pivot 201.2. In some embodiments, the pivot arms 202 each rotate about an axis that is approximately vertical with respect to the seat. Each pivot arm 202 also includes a link attachment 202.2 and a rear slot 202.1. As shown in FIG. 10, the left side pivot arm 202(L) includes a link attachment 202.2 for attaching to the first link 207 and the right side pivot arm 202(R) includes a link attachment 202.2 for attaching to the second link 208. As shown in FIGS. 8-10, each rear slot 202.1 attaches to a sliding pin 205 that is inserted into a hole 204.2 of the frame 204. The hole 204.2 and the sliding pin 205 may be arranged such that the axial direction of each is arranged approximately parallel to the vertical direction of the passenger seat.

As shown in FIGS. 8 and 9, the frame 204 includes attachment points 204.1 for attaching to both sides of the lower portion of the seat back 20. When loading conditions cause the upper portion of the seat back to move forward and pivot the seat back to cause the lower portion of the seat back to move rearward (such as a head impact during a crash condition), the frame 204 is pulled toward the rear of the seat (toward the top left portion of FIG. 8). The forward portion of the frame 204 is attached to the pivot arms 202.

The seat back 20 and frame 204 are typically secured in the static or retracted position shown in FIGS. 7A-8 where the first and second links 207 and 208 are parallel with one another (i.e., the retracted configuration of the breakover mechanism 200). In this retracted configuration, any loads transferred from the frame 204 into the pivot arms 202 through the sliding pins 205 are offset by forces/loads applied to the link attachments 202.2 by the first and second links 207 and 208. In some embodiments, the loads transferred from the frame 204 into the pivot arms 202 through the sliding pins 205 are in the fore/aft direction of the seat and the loads applied to the link attachments 202.2 by the first and second links 207 and 208 are in the lateral direction of the passenger seat. In the retracted configuration, the pivot arms 202 are static such that the sliding pins 205 are disposed adjacent to the inner edges of the rear slots 202.1 of the pivot arms 202.

The inertia weight assembly 203 includes a pivoting arm that includes a weight 203.1 at a first end of the pivoting arm and a roller 203.2 at a second end of the pivoting arm. In response to a known or threshold loading condition, the inertia weight assembly 203 rotates about a pivot point 203.3 and activates the breakover mechanism 200 independent of forces applied directly to the seat back 20. For example, a known acceleration or deceleration in the fore/aft direction causing a g-load (i.e., a threshold load), forces the weight 203.1 to move forward. The forward movement of the weight 203.1 causes the inertia weight assembly 203 to rotate about the pivot point 203.3 such that roller 203.2 presses against the hinge between the first and second links 207 and 208. The breakover mechanism 200 may be calibrated by adjusting the weight 203.1 such as changing the number and size of the weights assembled on the weight 203.1. In some embodiments, hinge between the first and second links 207 and 208 includes a spring 209 configured to bias the hinge toward the retracted and/or the deployed configuration.

FIG. 9 shows the breakover mechanism 200 immediately after the roller 203.2 presses the hinge between the first and second links 207 and 208, which causes the first and second links 207 and 208 to rotate relative to one another (such that the first and second links 207 and 208 are no longer parallel with one another). The rotation of the first and second links 207 and 208 also allows the pivot arms 202 to rotate about the pivot 201.2. Once the roller 203.2 presses against the hinge between the first and second links 207 and 208 and begins the rotation of the pivot arms 202, any loads pulling the frame 204 toward the rear of the seat (i.e., head impact forces during a crash that cause the upper portion of the seat back 10 to push forward and the lower portion of the seat back 10 to move rearward) also cause rotation of the pivot arms 202. For example, in some embodiments, a slight rotation of the pivot arms 202 causes the outer edges of the rear slots 202.1 to move toward the rear of the seat such that loads directed toward the rear of the seat through the frame 204 cause the sliding pins 205 to move toward the outer edges of the rear slots 202.1 (due to rotation of the pivot arms 202 and rearward movement of the frame 204).

Figure 11:
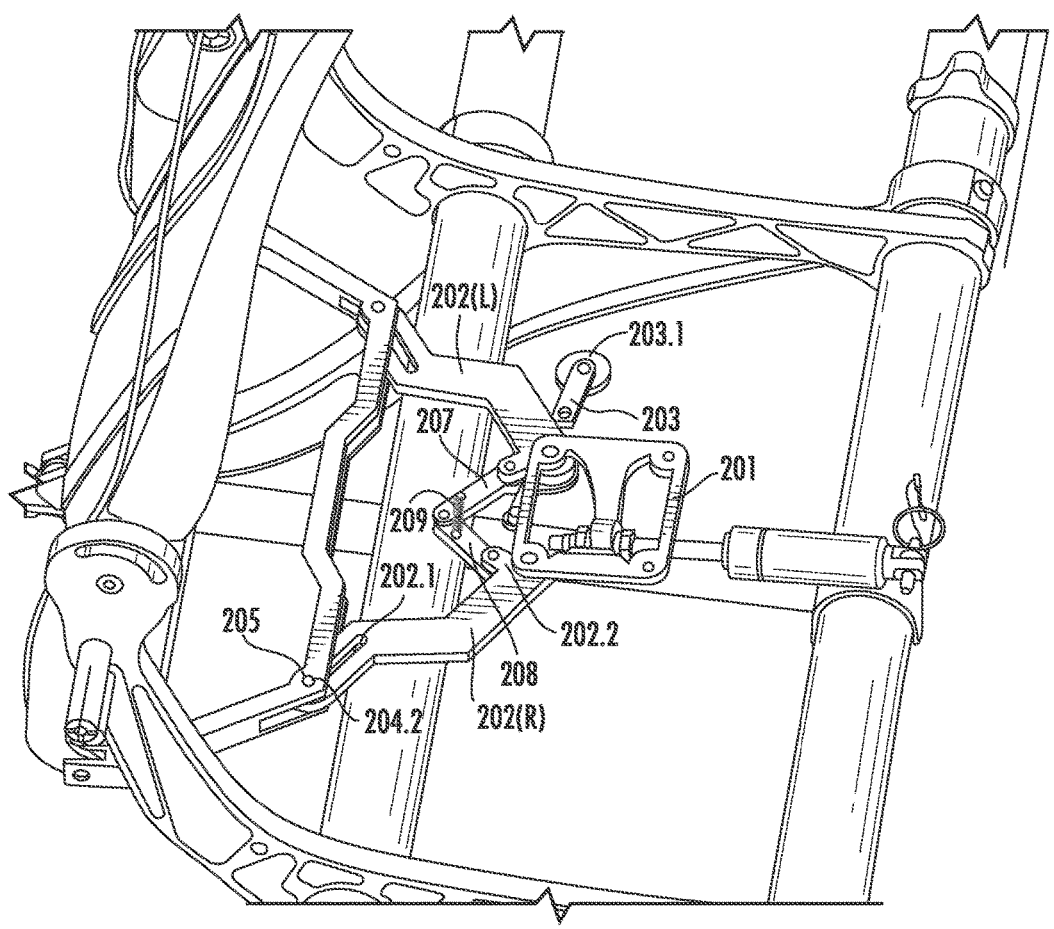
FIG. 11 is a detail perspective view of the passenger seat of FIG. 7A.

FIG. 10 shows an approximation of a halfway point between the retracted configuration (FIGS. 7A-8) and the deployed configuration (FIG. 11). In FIG. 10, the sliding pins 205 are disposed approximately halfway between the inner and the outer edges of the rear slots 202.1 of the pivot arms 202. The deployed configuration for the breakover mechanism 200 is shown in FIG. 11 where the first and second links 207 and 208 are nonparallel. The deployed configuration of the breakover mechanism 200 may be dictated by the length of the rear slots 202.1. In some embodiments, the deployed configuration of the breakover mechanism 200 may be dictated by the range of motion of the seat back 20.

The breakover mechanism 200 may be reversible, such that the seat back 20 may return to its original retracted configuration after the breakover event. The seat back 20 may be pushed to its upright position (retracted configuration) and the spring 209 helps pull the first and second links 207 and 208 back to the retracted configuration (where the first and second links 207 and 208 are parallel to one another).

The components of the seat, the breakover mechanism 100, and/or the breakover mechanism 200 may be formed of materials including, but not limited to, carbon composite, plastic, thermoplastic, steel, aluminum, stainless steel, other plastic or polymer materials, other metallic materials, other composite materials, or other similar materials. Moreover, the components of the seat may be attached to one another via suitable fasteners, which include, but are not limited to, screws, bolts, rivets or other mechanical or chemical fasteners.

In the following, further examples are described to facilitate understanding of aspects of the invention:

Example A

A breakover mechanism for a passenger seat comprising:
a frame member with a rear portion attached to two opposing sides of a seat back of the passenger seat wherein the frame member is at least partially disposed under a seat pan of the passenger seat;
at least one moving portion attached to a forward portion of the frame member;
a carriage portion fixedly attached to the seat pan; and
a single point mechanism attached to the carriage portion wherein, once a threshold loading condition occurs, the single point mechanism changes states to facilitate movement of the moving portion relative to the carriage portion.

Example B

The breakover mechanism of Example A or any of the preceding or subsequent examples, wherein the threshold loading condition comprises a crash condition.

Example C

The breakover mechanism of Example A or any of the preceding or subsequent examples, wherein the single point mechanism comprises a tension pin.

Example D

The breakover mechanism of Example C or any of the preceding or subsequent examples, wherein the tension pin comprises a first end attached to the carriage portion and a second end attached to the at least one moving portion.

Example E

The breakover mechanism of Example C or any of the preceding or subsequent examples, wherein the tension pin comprises a notch and the tension pin changes states when the tension pin fails under a tensile load.

Example F

The breakover mechanism of Example C or any of the preceding or subsequent examples, wherein the at least one moving portion slides in a fore/aft direction of the passenger seat relative to the carriage portion.

Example G

The breakover mechanism of Example F or any of the preceding or subsequent examples, wherein the carriage portion comprises protrusions that engage corresponding channels of the at least one moving portion such that the protrusions slide through the channels in the fore/after direction.

Example H

The breakover mechanism of Example A or any of the preceding or subsequent examples, wherein the at least one moving portion comprises a lug fitting that engages a clevis fitting of the frame member.

Example I

The breakover mechanism of Example H or any of the preceding or subsequent examples, wherein the lug fitting comprises a spherical bearing for engaging a pin attached to the clevis fitting.

Example J

The breakover mechanism of Example H or any of the preceding or subsequent examples, wherein an engagement between the lug fitting and the clevis fitting comprises a first primary fastener and a second failsafe fastener.

Example K

The breakover mechanism of Example A or any of the preceding or subsequent examples, wherein the single point mechanism comprises an inertia weight assembly.

Example L

The breakover mechanism of Example K or any of the preceding or subsequent examples, wherein the inertia weight assembly comprises a pivoting arm, a weight disposed at a first end of the pivoting arm, a roller at a second end of the pivoting arm, and a pivot point disposed between the first end and the second end.

Example M

The breakover mechanism of Example L or any of the preceding or subsequent examples, wherein the inertia weight assembly changes states when the weight moves forward due to the threshold loading condition and causing the pivoting arm to rotate about the pivot point.

Example N

The breakover mechanism of Example K or any of the preceding or subsequent examples, wherein the at least one moving portion comprises two pivot arms that each rotate about a vertical axis of the passenger seat relative to the carriage portion.

Example O

The breakover mechanism of Example K or any of the preceding or subsequent examples, wherein the at least one moving portion comprises two pivot arms that each comprise a rear slot that interfaces with the frame member.

Example P

A passenger seat comprising:
a seat back comprising an upper portion and a lower portion;
a seat pan; and
a breakover mechanism configured to facilitate rotation of the seat back,
wherein the breakover mechanism comprises:
a frame member with a rear portion attached to two opposing sides of the lower portion of the seat back wherein the frame member is at least partially disposed under the seat pan;
a slide rail attached to a forward portion of the frame member;

a slide carriage fixedly attached to the seat pan; and
a tension pin attached to a rear side of the slide carriage wherein, once a threshold loading condition occurs, the tension pin changes states to facilitate movement of the slide rail relative to the slide carriage.

Example Q

The passenger seat of Example P or any of the preceding or subsequent examples, wherein the tension pin comprises a first end attached to the slide carriage and a second end attached to the slide rail.

Example R

The passenger seat of Example P or any of the preceding or subsequent examples, wherein the tension pin comprises a notch and the tension pin changes states when the tension pin fails under a tensile load.

Example S

A passenger seat comprising:
a seat back comprising an upper portion and a lower portion;
a seat pan; and
a breakover mechanism configured to facilitate rotation of the seat back,
wherein the breakover mechanism comprises:
 a frame member with a rear portion attached to two opposing sides of the lower portion of the seat back wherein the frame member is at least partially disposed under the seat pan;
 two pivot arms that are each attached to a forward portion of the frame member;
 a carriage frame fixedly attached to the seat pan; and
 an inertia weight assembly attached to the carriage frame wherein, once a threshold loading condition occurs, the inertia weight assembly changes states to facilitate movement of the two pivot arms relative to the carriage frame.

Example T

The passenger seat of Example S or any of the preceding or subsequent examples, wherein the inertia weight assembly comprises a pivoting arm, a weight disposed at a first end of the pivoting arm, a roller at a second end of the pivoting arm, and a pivot point disposed between the first end and the second end.

Example U

The passenger seat of Example T or any of the preceding or subsequent examples, wherein the inertia weight assembly changes states when the weight moves forward due to the threshold loading condition and causing the pivoting arm to rotate about the pivot point.

Example V

The passenger seat of Example S or any of the preceding or subsequent examples, wherein:
the breakover mechanism comprises a first link and a second link; and
the breakover mechanism comprises a retracted configuration where the first and second links are parallel with one another.

Example W

The passenger seat of Example V or any of the preceding or subsequent examples, wherein the inertia weight assembly presses a hinge between the first and second links to move the breakover mechanism from the retracted configuration to a deployed configuration where the first and second links are nonparallel with one another.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A breakover mechanism for a passenger seat comprising:
 a frame member with a rear portion attached to two opposing sides of a seat back of the passenger seat wherein the frame member is at least partially disposed under a seat pan of the passenger seat, the frame member comprising a clevis fitting;
 at least one moving portion attached to a forward portion of the frame member, the at least one moving portion comprising a lug fitting;
 a carriage portion fixedly attached to the seat pan; and
 a single point mechanism attached to the carriage portion wherein, once a threshold loading condition occurs, the single point mechanism changes states to facilitate movement of the moving portion relative to the carriage portion, wherein:
 the lug fitting of the at least one moving portion engages the clevis fitting of the frame member; and
 the lug fitting comprises a spherical bearing for engaging a pin attached to the clevis fitting.

2. The breakover mechanism of claim 1, wherein the threshold loading condition comprises a crash condition.

3. The breakover mechanism of claim 1, wherein the single point mechanism comprises a tension pin.

4. The breakover mechanism of claim 3, wherein the tension pin comprises a first end attached to the carriage portion and a second end attached to the at least one moving portion.

5. The breakover mechanism of claim 3, wherein the tension pin comprises a notch and the tension pin changes states when the tension pin fails under a tensile load.

6. The breakover mechanism of claim 3, wherein the at least one moving portion slides in a fore/aft direction of the passenger seat relative to the carriage portion.

7. The breakover mechanism of claim 6, wherein the carriage portion comprises protrusions that engage corresponding channels of the at least one moving portion such that the protrusions slide through the channels in the fore/aft direction.

8. The breakover mechanism of claim 1, wherein an engagement between the lug fitting and the clevis fitting comprises a first primary fastener and a second failsafe fastener.

9. A passenger seat comprising:
- a seat back comprising an upper portion and a lower portion;
- a seat pan; and
- a breakover mechanism configured to facilitate rotation of the seat back,
- wherein the breakover mechanism comprises:
  - a frame member with a rear portion attached to two opposing sides of the lower portion of the seat back wherein the frame member is at least partially disposed under the seat pan;
  - a slide rail attached to a forward portion of the frame member;
  - a slide carriage fixedly attached to the seat pan; and
  - a tension pin attached to a rear side of the slide carriage wherein, once a threshold loading condition occurs, the tension pin changes states to facilitate movement of the slide rail relative to the slide carriage,
- wherein the tension pin comprises a notch and the tension pin changes states when the tension pin fails under a tensile load.

10. The passenger seat of claim 9, wherein the tension pin comprises a first end attached to the slide carriage and a second end attached to the slide rail.

11. A breakover mechanism for a passenger seat comprising:
- a frame member with a rear portion attached to two opposing sides of a seat back of the passenger seat wherein the frame member is at least partially disposed under a seat pan of the passenger seat, the frame member comprising a clevis fitting;
- at least one moving portion attached to a forward portion of the frame member, the at least one moving portion comprising a lug fitting;
- a carriage portion fixedly attached to the seat pan; and
- a single point mechanism comprising a tension pin wherein the single point mechanism is attached to the carriage portion wherein, once a threshold loading condition occurs, the single point mechanism changes states to facilitate movement of the moving portion relative to the carriage portion, wherein:
  - the lug fitting of the at least one moving portion engages the clevis fitting of the frame member;
  - the at least one moving portion slides in a fore/aft direction of the passenger seat relative to the carriage portion; and
  - the carriage portion comprises protrusions that engage corresponding channels of the at least one moving portion such that the protrusions slide through the channels in the fore/aft direction.

12. The breakover mechanism of claim 11, wherein the tension pin comprises a first end attached to the carriage portion and a second end attached to the at least one moving portion.

13. The breakover mechanism of claim 11, wherein the tension pin comprises a notch and the tension pin changes states when the tension pin fails under a tensile load.

14. The breakover mechanism of claim 11, wherein an engagement between the lug fitting and the clevis fitting comprises a first primary fastener and a second failsafe fastener.

15. A breakover mechanism for a passenger seat comprising:
- a frame member with a rear portion attached to two opposing sides of a seat back of the passenger seat wherein the frame member is at least partially disposed under a seat pan of the passenger seat, the frame member comprising a clevis fitting;
- at least one moving portion attached to a forward portion of the frame member, the at least one moving portion comprising a lug fitting;
- a carriage portion fixedly attached to the seat pan; and
- a single point mechanism attached to the carriage portion wherein, once a threshold loading condition occurs, the single point mechanism changes states to facilitate movement of the moving portion relative to the carriage portion, wherein:
  - the lug fitting of the at least one moving portion engages the clevis fitting of the frame member; and
  - an engagement between the lug fitting and the clevis fitting comprises a first primary fastener and a second failsafe fastener.

16. The breakover mechanism of claim 15, wherein the single point mechanism comprises a tension pin.

17. The breakover mechanism of claim 16, wherein the tension pin comprises a first end attached to the carriage portion and a second end attached to the at least one moving portion.

18. The breakover mechanism of claim 16, wherein the tension pin comprises a notch and the tension pin changes states when the tension pin fails under a tensile load.

19. The breakover mechanism of claim 16, wherein the at least one moving portion slides in a fore/aft direction of the passenger seat relative to the carriage portion.

20. The breakover mechanism of claim 19, wherein the carriage portion comprises protrusions that engage corresponding channels of the at least one moving portion such that the protrusions slide through the channels in the fore/aft direction.

* * * * *